(12) United States Patent
Kimura et al.

(10) Patent No.: US 7,330,420 B2
(45) Date of Patent: Feb. 12, 2008

(54) OBJECTIVE LENS UNIT, OPTICAL PICKUP APPARATUS AND OPTICAL INFORMATION RECORDING AND REPRODUCING APPARATUS

(75) Inventors: Tohru Kimura, Hachioji (JP); Shogo Yamamoto, Hachioji (JP)

(73) Assignee: Konica Corporation, Tokyo (JP)

( * ) Notice: Subject to any disclaimer, the term of this patent is extended or adjusted under 35 U.S.C. 154(b) by 540 days.

(21) Appl. No.: 10/624,535

(22) Filed: Jul. 23, 2003

(65) Prior Publication Data

US 2004/0114254 A1 Jun. 17, 2004

(30) Foreign Application Priority Data

Jul. 26, 2002 (JP) .............................. 2002-218288

(51) Int. Cl.
*G11B 7/00* (2006.01)
(52) U.S. Cl. ............................ 369/112.25; 369/112.05; 359/719
(58) Field of Classification Search ..................... None
See application file for complete search history.

(56) References Cited

U.S. PATENT DOCUMENTS 6,807,019 B2 * 10/2004 Takeuchi et al. ............ 359/742
6,947,368 B2 * 9/2005 Hendriks et al. ...... 369/112.26
2001/0050894 A1 12/2001 Takeuchi
2002/0005996 A1 1/2002 Kitamura et al.
2002/0036839 A1 3/2002 Kishima et al.
2002/0097508 A1 7/2002 Wada et al.
2003/0185134 A1 * 10/2003 Kimura et al. ......... 369/112.08

FOREIGN PATENT DOCUMENTS

EP 1 199 717 A2 4/2002
EP 1 304 689 A2 4/2003
WO WO 00/41173 7/2000

* cited by examiner

*Primary Examiner*—William Korzuch
*Assistant Examiner*—Joseph R. Haley
(74) *Attorney, Agent, or Firm*—Finnegan, Henderson, Farabow, Garrett & Dunner, L.L.P.

(57) ABSTRACT

An objective lens unit for use in an optical pickup apparatus, includes a first optical element arranged opposite to the optical information recording medium; a second optical element arranged at a light source side of the first optical element opposite to the first optical element and including a ring-shaped structure in which plural ring-shaped zones are formed on at least one optical surface of the second optical element such that neighboring ring-shaped zones cause a predetermined optical path difference for incident rays; and each of the first and second optical elements having a optical functional section and a flange section formed around the optical functional section, wherein the flange section of the first optical element and the flange section of the second optical element are formed so as to fix the first and second optical elements at predetermined respective relative positions.

17 Claims, 6 Drawing Sheets

OBJECTIVE LENS UNIT, OPTICAL PICKUP APPARATUS AND OPTICAL INFORMATION RECORDING AND REPRODUCING APPARATUS

BACKGROUND OF THE INVENTION

The present invention relates to an objective lens unit used for converging a light flux on an information recording surface of an optical information recording medium in an optical pickup device, the optical pickup device equipped with the objective lens unit and to an optical information recording apparatus.

Heretofore, a plastic lens has mainly be used as an objective lens that is used in an optical pickup device for recording/reproducing for optical information recording media such as CD, MO and DVD.

Since the specific gravity of the plastic lens is low, compared with a glass lens, the load on an actuator that drives the objective lens can be reduced, which makes it possible for the objective lens to follow at high speed.

Further, a plastic lens manufactured through injection molding of plastic materials in a metal mold can be manufactured on a mass-production basis at higher accuracy, by manufacturing a metal mold in a desired shape to be highly accurate. It is therefore possible to attain a high-performance and low-cost lens.

In recent years, there have been advanced studies and developments of an optical pickup device for a new high density optical disk employing a violet semiconductor laser light source having a wavelength of about 400 nm and an objective lens wherein the numerical aperture on the part of an image (NA) is raised up to the level of about 0.85. As an example, in the case of an optical disk with a numerical aperture of 0.85 and a light source wavelength of 405 nm (hereinafter referred to as "high density DVD"), information of 20-30 GB per one surface can be recorded on an optical disk having a diameter of 12 cm that is in the same size as in DVD (numerical aperture of 0.6, a light source wavelength of 650 nm and storage capacity of 4.7 GB).

In the optical pickup device for the high density DVD of this kind, it is required to record and reproduce three types of optical disks each having a different standard (recording density) such as high density DVD, DVD and CD, on a compatible basis.

Optical pickup devices having interchangeability for plural types of optical information recording media (for example, CD and DVD) have been developed, and a part of them are on the market. In Optical pickup apparatuses of this kind, there is used a laser which has a different wavelength depending on a type of the optical information recording medium. Therefore, in each of these many optical pickup apparatuses, there is formed, on an optical surface of an objective lens, a ring-shaped structure that is divided into plural ring-shaped zones which cause a prescribed optical path difference for incident light, so that a single objective lens may have interchangeability for plural types of optical information recording media (these technologies are disclosed in TOKKAI Nos. 2000-81566, 2001-195769 and 2001-51192).

In the optical information recording medium capable of recording and reproducing data, energy density (power) of a laser beam is raised, for recording data, by increasing an electric current that flows through a laser oscillator, and energy density of a laser beam is lowered, for reproducing data, by decreasing an electric current that flows through a laser oscillator.

In the optical pickup device capable of recording and reproducing data for the optical information recording medium such as high density DVD, data reading and data writing are conducted alternatively over and over again. In this case, there occurs a phenomenon that a wavelength of the laser becomes longer instantaneously for raising energy density of a laser beam emitted from the laser oscillator quickly, when the state of reading is switched to the state of writing ("mode-hop").

When a wavelength of the laser becomes longer, a position of a beam spot formed on an optical axis is moved by dispersion of a lens to be farther from the objective lens ("chromatic aberration"). Namely, the position of the beam spot is shifted out of an information recording surface of an optical disk, and there is the possibility of occurrence of errors when writing data on the optical disk.

In general, it is known that the shorter a wavelength of light is, the greater an amount of change of the refractive index of lens material for unit fluctuation amount of a wavelength is.

In the optical pickup device capable of recording/reproducing for high density DVD, a violet laser with a wavelength of about 400 nm is used as a light source, and an amount of fluctuation of a wavelength caused by mode-hop is several nanometers. Therefore, chromatic aberration caused by mode-hop turns out to be great, compared with an optical pickup device for CD use (light source wavelength: about 780 nm) and an optical pickup device for DVD use (light source wavelength: about 650 nm), thus, the chromatic aberration needs to be corrected.

As an objective lens wherein the chromatic aberration has been corrected, TOKKAIHEI No. 6-242373 discloses an objective lens wherein a ring-shaped structure that is divided into plural ring-shaped zones which cause a prescribed optical path difference for incident light is formed on an optical surface of the objective lens.

Further, the optical pickup device is exposed to changes of temperatures caused by fluctuations of atmospheric temperatures at the location of installation and by generation of heat resulting from operations of the device.

When the temperature of the optical pickup device rises, a wavelength of a laser beam emitted from a laser oscillator generally grows greater. Further, plastic has characteristics that the refractive index of the plastic becomes smaller when its temperature rises. In addition, a form of a plastic lens is easily changed because a coefficient of thermal expansion of plastic is greater than that of glass.

Due to these primary factors, spherical aberration ("temperature characteristic aberration") occurs on a beam spot formed on an optical axis, under the ambient condition of higher (or lower) than the temperature assumed in the course of designing the optical pickup device. This temperature characteristic aberration needs to be corrected.

AS an objective lens wherein the temperature characteristic aberration has been corrected, TOKKAIHEI No. 11-337818 discloses an objective lens wherein a ring-shaped structure that is divided into plural ring-shaped zones which cause a prescribed optical path difference for incident light is formed on an optical surface of the objective lens.

In the case of high density DVD, a curvature on the optical surface (the optical surface closer to the optical information recording medium, in particular) of the objective lens is greater because numerical aperture NA on the part of an image of the objective lens is set to about 0.85. When a ring-shaped structure is provided on the optical surface having this great curvature for making the objective lens to have interchangeability for plural types of optical information recording media, and/or for correcting chromatic aberration, and/or for correcting temperature characteristic aberration, a pitch of the ring-shaped structure becomes extremely small (about several microns).

A metal mold used for injection molding for a plastic lens is manufactured by a method for cutting with a diamond cutting tool with a microscopic diameter called SPDT (Single Point Diamond Turning). However, in processing a metal mold with SPDT, there is a problem of declined efficiency of utilization of a laser beam caused by phase inconformity portion generated when a shape of a tip of the diamond cutting tool is transferred onto the metal mold, when forming, on the optical surface, a fine form such as a ring-shaped structure having a pitch of several microns. Though binary-optics making technology wherein photolithography and etching are applied repeatedly and an electron beam drafting technology represent a method of manufacturing an optical element which is suitable for forming fine shapes accurately, there have not been reported an example to manufacture an optical element having a fine form on an optical surface having great curvature such as an objective lens for high density DVD and an example to manufacture a metal mold that is used for injection molding of an optical element.

Further, even when accurate preparation of a fine form is technically possible by using a diamond cutting tool having a small tip shape within a range where declined efficiency of utilization of a laser beam caused by phase inconformity portion is not a problem, or even when manufacture of an optical element having a fine form on an optical surface having great curvature is technically possible owing to the binary-optics making technology and to the electron beam drafting technology, or even when manufacture of a metal mold used for injection molding of an optical element is technically possible, in processing of a metal mold with SPDT in the future, there still remains a problem of a decline of efficiency of utilization of a laser beam, because an influence of a shadow of a step portion of a ring-shaped structure is great, if a ring-shaped structure with a pitch of about several microns is provided on an optical surface having the great curvature.

SUMMARY OF THE INVENTION

An object of the invention is to provide an objective lens unit for optical pickup use wherein plastic is used as a material, a high numerical aperture in the case of using a light source having a short wavelength, correction of chromatic aberration and of temperature characteristic aberration, and recording/reproducing for plural types of optical information recording media are possible, and manufacture is easy and cost is low and an efficiency of utilization of a laser beam is high, an optical pickup device equipped with the aforesaid objective lens unit and an optical information recording and reproducing apparatus.

The invention described in Item 1 for solving the problems stated above is represented by objective lens units 1 and 2 each being used for converging light fluxes (laser) L1-L3 on information recording surfaces M1r-M3r respectively of optical information recording media (high density DVD) M1, (DVD) M2 and (CD) M3, respectively in optical pickup devices 3 and 4, as shown, for example, in FIGS. 1-4 and FIG. 8. Each of the objective lens units is provided with first optical element B arranged to face the optical information recording media M1-M3 and with second optical element A that is arranged to face toward light sources (semiconductor laser oscillator) LD1-LD3 of the first optical element B, and is provided, on at least one optical surface thereof, with a ring-shaped structure which is formed so that neighboring rings among divided plural rings may cause a prescribed optical path difference for incident light, and the first optical element B is provided with optical functional portion B1 and flange portion B2 formed on the periphery of the optical functional portion B1, while, the second optical element A is provided with optical functional portion A1 and flange portion A2 formed on the periphery of the optical functional portion A1, and it is characterized that the flange portion B2 of the first optical element B and the flange portion A2 of the second optical element A are formed so that the first optical element B and the second optical element A may be fixed at the prescribed relative position.

In this case, the objective lens mentioned above means, in a narrow sense, a lens which is arranged at the position closest to an optical information recording medium to face it under the condition that the optical information recording medium is loaded in the optical pickup device, and it means, in a broad sense, a lens which can be operated by an actuator together with the aforesaid lens at least in the direction of its optical axis. Therefore, in the present specification, a numerical aperture of an objective lens closer to an image (closer to the optical information recording medium) means a numerical aperture of the lens surface positioned to be closest to the optical information recording medium on the objective lens. Further, in the present specification, a necessary (and prescribed) numerical aperture means a numerical aperture stipulated by the standard for each optical information recording medium, or, a numerical aperture of an objective lens having a diffraction limit performance which can obtain a spot diameter necessary to record or reproduce information depending on a wavelength of a light source to be used, for each optical information recording medium.

Further, the aforementioned recording of information means recording of information on an information recording surface of the optical information recording medium. Reproduction of information mentioned in the present specification means reproduction of information recorded on the information recording surface of the optical information recording medium. The objective lens of the invention may be either one used for conducting only recording or reproducing, or one used for conducting both recording and reproducing. Or, it may either be one that is used to conduct recording for a certain optical information recording medium and to conduct reproducing for another optical information recording medium, or it may further be one that is used to conduct recording or reproducing for a certain optical information recording medium and to conduct both recording and reproducing for another optical information recording medium. Incidentally, reproducing mentioned in this case includes only reading of information.

In the invention described in Item 1 wherein there are provided the first optical element arranged to face an optical information recording medium and the second optical element that is provided, on at least one optical surface thereof, with a ring-shaped structure which is formed so that neighboring rings among divided plural rings may cause a prescribed optical path difference for incident light, it is possible to achieve a high numerical aperture of the objective lens unit by establishing the curvature of the optical surface closer to the light source on the first optical element to be large, and to obtain an objective lens unit for which the efficiency of utilization of a laser beam is high by establishing the curvature of the optical surface of the second optical element to be relatively small and by making an influence of a shade of a step portion of the ring-shaped structure to be small.

It is further possible to make the objective lens unit to have interchangeability for plural types of optical information recording media, to correct chromatic aberration and to correct temperature characteristic aberration, by utilizing an aberration correction function for the ring-shaped structure of the second optical element.

By forming a ring-shaped structure on the second optical element on which the curvature of the optical surface is relatively small, the ring-shaped structure can be formed highly accurately, because a pitch of the ring-shaped structure that realizes an aberration correction function is great.

The aberration mentioned here means chromatic aberration, temperature characteristic aberration and a change of spherical aberration that is caused when a thickness of a transparent base board of the optical information recording medium is changed.

Since the flange portion of the first optical element and the flange portion of the second optical element are formed so that the first optical element and the second optical element may be fixed at the prescribed relative position, relative positioning for the first optical element and the second optical element can be realized accurately and easily. It is therefore possible to combine the first optical element and the second optical element and thereby to assemble an objective lens unit accurately and easily, after forming the first optical element and the second optical element respectively.

The invention described in Item 2 is characterized in that each of the first optical element B and the second optical element A is a plastic lens, in each of the objective lens units 1 and 2 described in Item 1.

In the invention described in Item 2, expenses for glass materials can be cut, and an optical element provided with a ring-shaped structure can be manufactured on a mass-production basis through injection molding employing a metal mold, thus, an objective lens unit can be manufactured at low cost.

The invention described in Item 3 is characterized in that $$|P2/P1| \leq 0.2$$

is satisfied when P1 (mm$^{-1}$) represents paraxial power of the first optical element B and P2 (mm$^{-1}$) represents paraxial power of the second optical element A, in each of the objective lens units 1 and 2 described in Item 1 or 2.

In the invention described in Item 3, the same effects as in the invention described in Item 1 or 2 can be obtained, and paraxial power of the second optical element turns out to be small, thus, the curvature of the optical surface of the second optical element can be made small. As a result, it is possible to prevent a decline of the efficiency of utilization of a laser beam, because an influence of a shade of the step portion of the ring-shaped structure can be made small. Further, owing to that the curvature of the optical surface on which the ring-shaped structure of the second optical element is formed is small, it is possible to secure the larger pitch of the ring-shaped structure, compared with an occasion where such ring-shaped structure is formed on the optical surface of the first optical element where the curvature tends to be small, thus, it is possible to keep a decline of the efficiency of utilization of a laser beam resulting from a manufacture error in the shape of the ring-shaped structure to be small. Further, by making paraxial power of the second optical element to be small, a distance (working distance) between the objective lens and the optical information recording medium can be secured to be large.

The invention described in Item 4 is characterized in that adjoining rings in the ring-shaped structure are formed to be displaced each other in the optical axis direction to cause the prescribed optical path difference in each of the objective lens units 1 and 2 described in either one of Items 1-3.

The invention described in Item 5 is characterized in that the ring-shaped structure is a diffraction structure having a function to diffract incident light in each of the objective lens units 1 and 2 described in Item 4.

The optical surface (diffractive surface) on which the diffraction structure is formed means a surface of the optical element, for example, a surface of the lens on which a relief is provided so that the surface may have the function to diffract an incident light flux, and when there exist an area where diffraction is caused and an area where diffraction is not caused on the same optical surface, the aforesaid optical surface means an area where diffraction is caused. Further, a diffraction structure or a diffraction pattern means this area where diffraction is caused. As a form of the relief, there is known a sawtoothed form or a step-like form for each ring-shaped structure which is observed when substantially concentric rings are formed around the center of an optical axis on the surface of the optical element, for example, and when the section of the concentric rings is viewed on a plane including the optical axis, and these forms are included in the form of the relief.

Though diffracted lights of an infinite number of orders, such as zero-order diffracted light, ±first-order diffracted light, ±second-order diffracted light, . . . are generated from the optical surface (diffractive surface) on which a diffractive structure is formed, in general, it is possible to set a form of the relief by making diffraction efficiency of the specific order to be higher than that of other order or by making diffraction efficiency of one specific order (for example, +first-order diffracted light) to be almost 100% according to circumstances, in the case, for example, of the diffractive surface having the relief whose meridional section is serrated as stated above. In the present invention, "a diffractive structure is optimized by wavelength λB and by the diffraction order n" means that a form of a diffractive structure (relief) is established so that the diffraction efficiency of the diffracted light having the diffraction order n may be 100% theoretically.

The invention described in Item 6 is characterized in that the ring-shaped structure corrects chromatic aberration generated on at least the first optical element B in each of the objective lens units 1 and 2 described in either one of Items 1-5.

In the invention described in Item 6, the same effects as those in the invention described in either one of Items 1-5 can be obtained, and chromatic aberration generated on at least the first optical element is corrected by the ring-shaped structure.

Therefore, even when an instantaneous change (mode-hop) of a wavelength of a laser is generated, in switching from the state of reading to the state of writing for the optical information recording medium, the chromatic aberration can be corrected.

In the case of high density DVD in particular, it is possible to prevent errors in the case of writing data on the optical information recording medium, because the wave length of the laser to be used is short compared with CD and DVD, although chromatic aberration tends to be generated by dispersion of the lens.

The invention described in Item 7 is characterized in that the wavelength to be used is 500 nm or less in each of the objective lens units 1 and 2 described in Item 6.

The invention described in Item 8 is characterized in that the first optical element B is a plastic lens and the aforesaid ring-shaped structure corrects spherical aberration caused by a change of the refractive index of the first optical element B, in each of the objective lens units 1 and 2 described in either one of Items 1-5.

In this case, the change of the refractive index is caused by temperature fluctuations of the first optical element.

The invention described in Item 9 is characterized in that the numerical aperture on the image side is 0.75 or more in each of the objective lens units 1 and 2 described in Item 8.

In each of the objective lens units 1 and 2 described in either one of Items 1-9, the invention described in 10 is characterized in that a thickness of a transparent base board for protecting the information recording surfaces M1$r$-M3$r$ and a wavelength of light used for recording and/or reproducing of information are used to converge light fluxes (laser) L1-L3 on information recording surfaces M1$r$-M3$r$ of the plural types of optical information recording media (high density DVD) M1, (DVD) M2 and (CD) M3 each being different from others, in each of the objective lens units 1 and 2 and the ring-shaped structure corrects spherical aberration caused by a change of the thickness of the transparent base board of each of the information recording media M1-M3 and/or spherical aberration caused by a change of a wavelength used for recording and/or reproducing of information for each of the information recording media M1-M3.

In this case, the transparent base board means an optically transparent and parallel flat plate which is formed on the information recording surface to be closer to a plane of incidence for the light flux on the information recording surface, to protect the information recording surface of the optical information recording medium (optical disk), while, the thickness of the transparent base board means a thickness of the parallel flat plate. A light flux emitted from the light source is converged by an objective lens on the information recording surface of the optical information recording medium (optical disk) through the transparent base board. In the present specification, high density DVD includes those having a transparent base board having another thickness and those wherein a thickness of the transparent base board is zero, namely, those having no transparent base board, in addition to an optical information recording medium having 0.1 mm-thick transparent base board given as an example.

In the invention described in Item 10, the same effects as those in the invention described in either one of Items 1-9 can be obtained, and spherical aberration caused by a change of the thickness of the transparent base board of each of the information recording media and/or spherical aberration caused by a change of a wavelength used for recording and/or reproducing of information for each of the information recording media, is corrected, thus, it is possible to make the objective lens unit to have interchangeability for plural types of optical information recording media.

The invention described in Item 11 is characterized in that $$0.8 \leq P1 \cdot T1 \leq 1.8$$

is satisfied when P1 (mm$^{-1}$) represents paraxial power of the first optical element B and T1 (mm) represents a thickness on the optical axis of the first optical element B, in each of the objective lens units 1 and 2 described in either one of Items 1-10.

In the invention described in Item 11, the same effects as those in the invention described in either one of Items 1-10 can be obtained, and it is possible to obtain a light-weight objective lens unit wherein image height characteristics are excellent and a sufficient working distance can be secured. Namely, when the lower limit of the expression above is kept, the third-order astigmatism component in the case of evaluating image height characteristics with wavefront aberration is not too great, and high order coma component of fifth-order or higher is not too great. In addition, an edge thickness of the first optical element can be secured sufficiently. If the upper limit is kept, the third-order spherical aberration component in the case of evaluating image height characteristics with wavefront aberration is not too great, and fifth-order coma component is not too great, and coma difference is not too great. In addition, sufficient working distance can be secured, and a volume of the first optical element is not too great, thus, load on an actuator can be lightened.

The invention described in Item 12 is characterized in that the first optical element B is a dioptric lens (refractive lens) in each of the objective lens units 1 and 2 described in either one of Items 1-11.

The dioptric lens in this case means an optical element whose refraction function only is used for changing the direction of a ray of light of incidence, and an optical element (for example, an optical element having a diffractive function) having, on the optical surface, the ring-shaped structure divided into plural rings is not included in the dioptric lens in the present specification.

The invention described in Item 13 is characterized in that the ring-shaped structure is formed on the aspheric surface, in each of the objective lens units 1 and 2 described in either one of Items 1-12.

The invention described in Item 14 is characterized in that the flange portion B2 of the first optical element B and the flange portion A2 of the second optical element A are formed to be in shapes which make them to be fitted each other and to be in contact with each other, and thereby the first optical element B and the second optical element A can be made to be fixed at the prescribed relative position, in each of the objective lens units 1 and 2 described in either one of Items 1-13.

In the invention described in Item 14, the same effects as those in the invention described in either one of Items 1-13 can be obtained, and the flange portion of the first optical element and the flange portion of the second optical element are formed to be in shapes which make them to be fitted each other and to be in contact with each other, and thereby, the relative positioning of the first optical element and the second optical element can be realized highly accurately and easily. It is therefore possible to combine the first optical element and the second optical element and thereby to assemble an objective lens unit accurately and easily, after forming the first optical element and the second optical element respectively.

Each of optical pickup devices 1 and 2 representing the invention described in Item 15 is characterized to be provided with the objective lens unit described in either one of Items 1-14, as shown, for example, in FIG. 1-FIG. 4.

In the invention described in Item 15, an optical pickup device having the same effects as those in the invention described in either one of Items 1-14 can be obtained.

An optical information recording and reproducing apparatus (recording and reproducing apparatus for high density DVD, or high density DVD/DVD/CD-compatible recording and reproducing apparatus) representing the invention described in Item 16 is characterized to be provided with each of optical pickup devices 3 and 4 described in Item 15.

In the invention described in Item 16, an optical information recording and reproducing apparatus having the same effects as those in the invention described in either one of Items 1-14 can be obtained.

DETAILED DESCRIPTION OF THE PREFERRED EMBODIMENT

Figure 1:
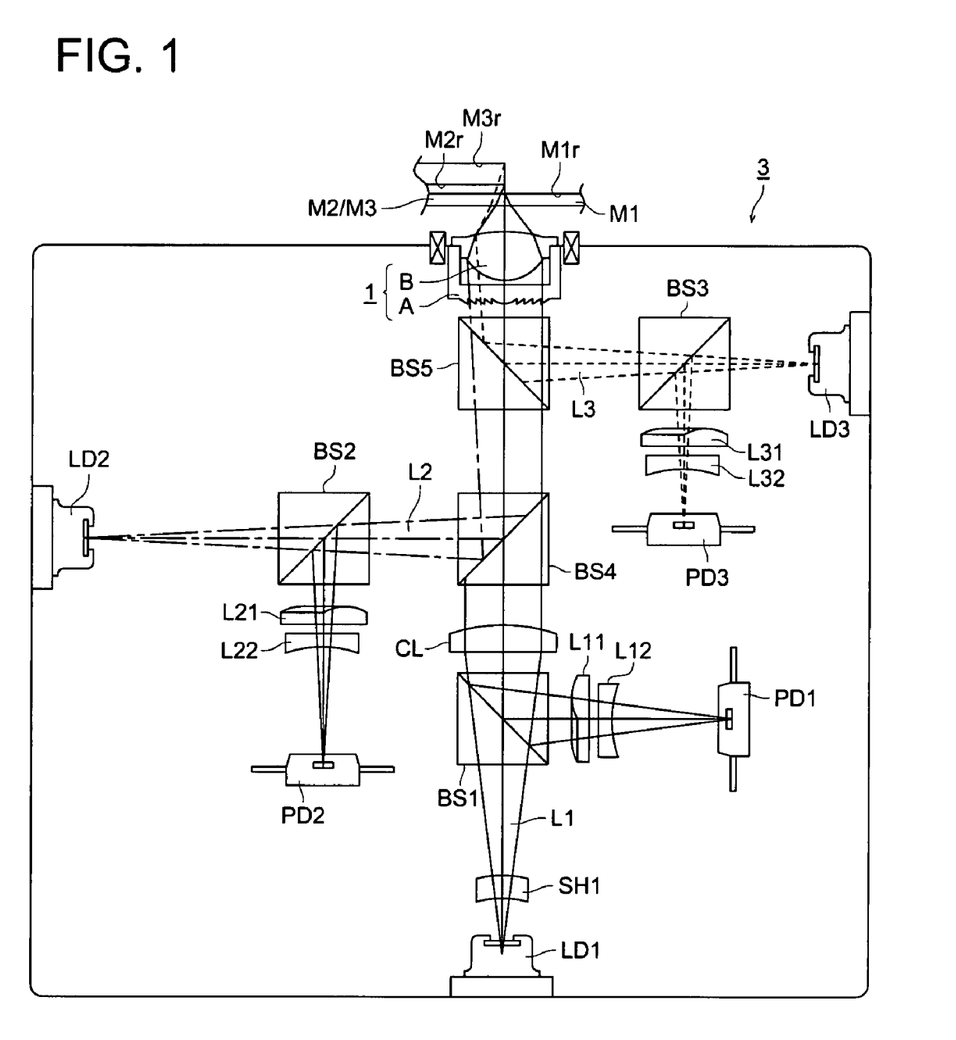
FIG. 1 is a schematic diagram showing the structure of an example of an optical pickup device of the invention.
Figure 2:
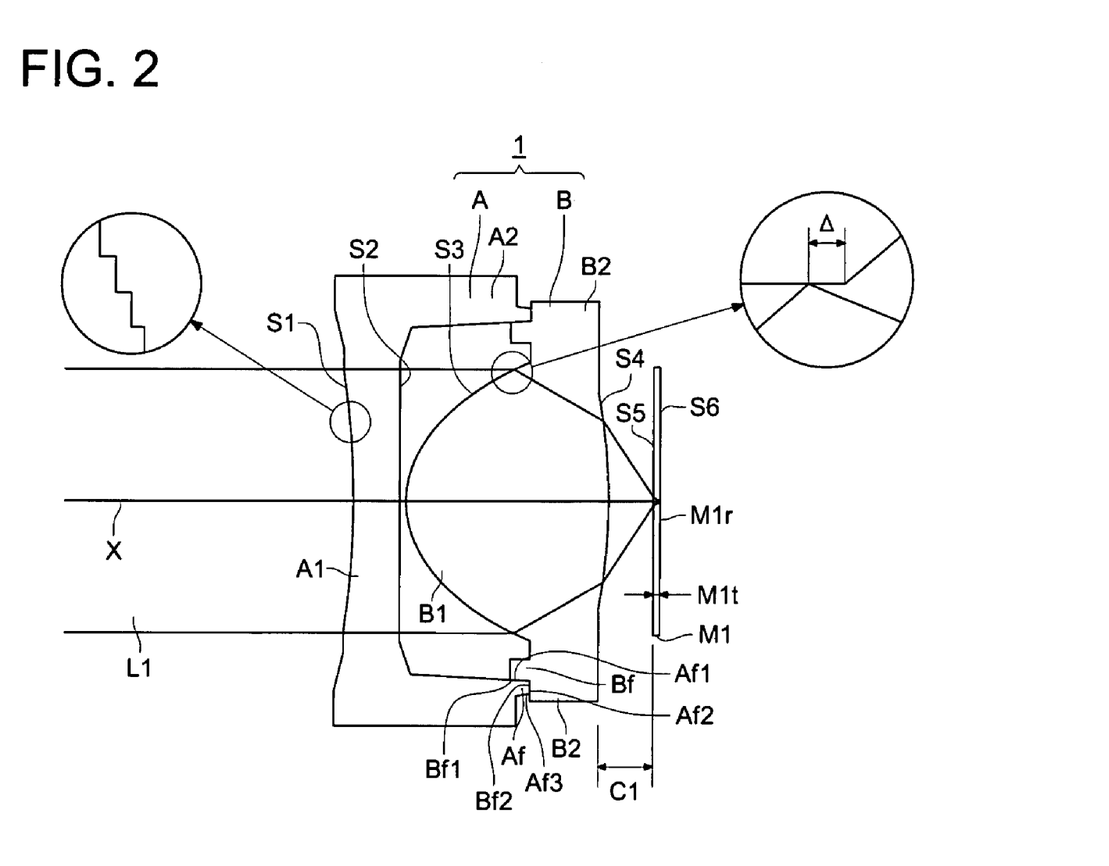
FIG. 2 is a diagram of an optical path showing how a light flux is converged on an optical recording surface of high density DVD by an example of an objective lens unit of the invention.

An embodiment of an objective lens unit of the invention will be explained as follows, referring to the drawings. FIG. 1 is a diagram showing the schematic structure of the objective lens unit of the present embodiment, an optical pickup device equipped with the objective lens unit and of the optical information recording and reproducing apparatus.

First Embodiment

Objective lens unit 1 of the present embodiment is one that is structured to have interchangeability for three types of optical disks (high density DVD, DVD and CD) each having different standard (recording density), and to be capable of recording and/or reproducing for information on these optical disks.

This objective lens unit is composed of second optical element A whose both sides are made to be aspheric surfaces and a ring-shaped structure is formed on the aspheric surface and of first optical element B whose both sides are made to be aspheric surfaces to be provided with light-converging functions.

Each of the first optical element B and the second optical element A is made of plastic respectively, and they are provided with optical function portions B1 and A1 as well as with flange portion B2 formed on the periphery of the optical function portion. Flange portion B2 of the first optical element B and flange portion A2 of the second optical element A are formed to be in shapes which make them to be fitted with each other and to be in contact with each other, thus, the first optical element B and the second optical element A can be fixed at the prescribed relative position.

In order for the first optical element B and the second optical element A to be fitted with each other and to be in contact with each other so that they are fixed at the prescribed relative position, the flange portion of the element can be made long properly in the direction towards the other party on both sides or one side of the element. The direction towards the other party in this case means the direction towards the side where these both elements face each other in the optical axis direction, for example, the direction towards the light source side for the first optical element B, and the direction towards the optical information recording medium side for the second optical element A. When the flange portion is made to be long in this direction, the possibility of change in shape of an optical surface of an optical functional portion which is formed to be solid integrally grows greater, because an amount of shrinking in the optical axis direction and an amount of bending of the flange grow greater in the course of plastic molding. Since the first optical element B is an element having a high numerical aperture, its optical surface is required the higher accuracy in the form, and an influence thereon by shrinking and bending of its flange portion is greater, compared with the second optical element A. It is therefore preferable to have the shape wherein the flange portion A2 of the second optical element A is longer than the flange portion B2 of the first optical element B.

Being fitted with each other mentioned hear means positioning in the direction perpendicular to the optical axis, and being in contact with each other means positioning in the optical axis direction.

Optical pickup devices 3 and 4 and an optical information recording and reproducing apparatus are structured so that information is read from an information recording surface by a laser (light flux) with a wavelength of 405 nm emitted from semiconductor laser oscillator LD1, by a laser with a wavelength of 650 nm emitted from semiconductor laser oscillator LD2, and by a laser with a wavelength of 780 nm emitted from semiconductor laser oscillator LD3, respectively for high density DVD, DVD and CD each representing an optical information recording medium.

When data are recorded and/or reproduced for high density DVD (M1), laser L1 having a wavelength 405 nm emitted from semiconductor laser LD1 passes through beam shaper SH1 to be shaped and beam splitter BS1, then, is made by collimator CL to be parallel light flux, and passes through beam splitters BS4 and BS5 to advance toward objective lens unit 1. Then, a laser beam is converged by the objective lens unit 1 on information recording surface M1r of high density DVD (M1) having a transparent and protective base board.

The laser L1 modulated by information bit and reflected on the information recording surface M1r passes again through the objective lens unit 1, beam splitters BS4 and BS5 and the collimator CL, to be reflected on beams splitter BS1, and is given astigmatism by cylindrical lens L11, and enters optical detector PD1 after passing through concave lens L12, thus, reading signals of information recorded on high density DVD (M1) are obtained by the use of signals outputted from the optical detector PD1.

When conducting recording and/or reproducing of data for DVD (M2), laser L2 having a wavelength of 650 nm emitted from semiconductor laser LD2 passes through beam splitter BS2, then, reflected on the beam splitter BS4, and passes through the beam splitter BS5 to advance toward the objective lens unit 1. Thus, the objective lens unit 1 converges a laser beam on information recording surface M2r of DVD (M2) having a transparent and protective base board.

The laser L2 modulated by information bit and reflected on the information recording surface M2r passes again through the objective lens unit 1 and beam splitter B5 to be reflected on beams splitters BS4 and BS3, and is given astigmatism by cylindrical lens L21, and enters optical detector PD2 after passing through concave lens L22, thus, reading signals of information recorded on DVD (M1) are obtained by the use of signals outputted from the optical detector PD2.

When conducting recording and/or reproducing of data for CD (M3), laser L3 having a wavelength of 780 nm emitted from semiconductor laser LD3 passes through beam splitter BS3, then, reflected on the beam splitter BS5 to advance toward the objective lens unit 1. Thus, the objective lens unit 1 converges a laser beam on information recording surface M3r of CD (M3) having a transparent and protective base board.

The laser L3 modulated by information bit and reflected on the information recording surface M3r is reflected again by the objective lens unit 1 and beam splitters BS5 and BS3, and is given astigmatism by cylindrical lens L31, and enters optical detector PD3 after passing through concave lens L32, thus, reading signals of information recorded on CD (M3) are obtained by the use of signals outputted from the optical detector PD3.

In the case of recording/reproducing of each optical information recording medium (high density DVD, DVD and CD), changes in amount of light caused by changes of a spot shape and by positional changes on optical detectors PD1-PD3 are detected to conduct focusing detection and track detection. Based on results of the detection, a two-dimensional actuator moves the objective lens unit 1 so that lasers L1-L3 emitted respectively from semiconductor laser oscillators LD1-LD3 may form images respectively on information recording surfaces M1r-Mr3 of optical information recording media (high density DVD, DVD and CD), and lasers L1-L3 emitted .respectively from semiconductor laser oscillators LD1-LD3 may form images on each prescribed track.

A ring-shaped diffractive structure is formed on each aspheric surface of both sides (optical surfaces S1 and S2) of optical element A, and its paraxial power is substantially zero.

Optical element B is a plastic lens wherein aberration correction has been made for the transparent and protective base board (thickness: 0.1 mm) of high density DVD (M1), and a design wavelength is 405 nm, a focal length is 2.2 mm and a numerical aperture on the part of a recording medium is 0.85.

When the first optical element B is used in recording/reproducing of data for DVD (M2) (wavelength: 650 nm, numerical aperture on the part of a recording medium: 0.65 and thickness of transparent and protective base board of DVD: 0.6 mm) and CD (M3) (wavelength: 780 nm, numerical aperture on the part of a recording medium: 0.50 and thickness of transparent and protective base board: 1.2 mm), spherical aberration is changed in the direction of over correction by a difference in thickness of the transparent and protective base board.

Even when the third-ordered component of the spherical aberration changed to be over correction is removed by making a divergent light flux to enter the optical element B, higher-ordered component still remains, which makes it impossible to conduct recording and/or reproducing of information again for DVD (M2) and CD (M3), if no action is taken.

Though violet laser LD1 representing a light source for high density DVD (M1) is said that its oscillation wavelength is changed by mode-hop by about 1 nm, the best image position of optical element B evaluated by wavefront aberration is changed by 0.49 μm when the wavelength of the incident light becomes 406 nm that is longer than the design wavelength by 1 μm, and thereby, a defocus component is added, and the wavefront aberration is deteriorated to 0.162 λ rms. Accordingly, when the first optical element B is used independently, light-converging power for high density DVD is deteriorated remarkably in the case of mode-hop, which makes it impossible to conduct recording and/or reproducing information stably.

Further, under the assumption that a change of refractive index of the first optical element B caused by temperature rise is $-9.0\times10^{-5}/°$ C., and a rate of change of the wavelength of the violet semiconductor laser caused by temperature rise is 0.05 nm/° C., spherical aberration of the optical element B is changed in the direction of over correction by temperature rise of 30° C., and the wavefront aberration in the case of recording and/or reproducing for high density DVD (M1) is deteriorated to 0.145 λrms. Accordingly, when the first optical element B is used independently, light-converging power for high density DVD (M1) is deteriorated remarkably, which makes it impossible to conduct recording and/or reproducing information stably.

By utilizing the diffraction power of the diffractive structure formed on the second optical element A, the objective lens unit 1 in the present embodiment corrects the following changes stated above.

(1) A change of spherical aberration caused by a difference of a thickness of the transparent and protective base board (2) A change of the best image position generated by mode-hop of the violet semiconductor laser LD1.

(3) A change of spherical aberration caused by a change of the refractive index resulting from the temperature change Objective lens unit 1 of the present embodiment uses $6^{th}$ ordered diffracted light generated by the diffractive structure of the second optical element A for high density DVD, $4^{th}$ ordered diffracted light generated by the diffractive structure of the second optical element A for DVD, and 3rd ordered diffracted light generated by the diffractive structure of the second optical element A for CD, as light for recording and/or reproducing of information.

Ring-shaped diffractive structures as shown in Table 2 are formed respectively on both surfaces (the first surface and the second surface in Table 1) of the second optical element A, and they are optimized so that the wavelength may be 415 nm, the diffraction order may be 6 and the diffraction efficiency may be 100% theoretically.

Optical surfaces S1 and S2 of the first optical element B and optical surfaces S3 and S4 of the second optical element A are formed to be in an aspheric surface form expressed by the following (Numeral 1).

$$X = \frac{h^2/r}{1+\sqrt{1-(1+\kappa)h^2/r^2}} + \sum_{i=2}^{10} A_{2i} h^{2i} \quad \text{(Numeral 1)}$$

In the above expression, Z represents an axis in the direction of an optical axis (the direction of travel of light has a positive sign), h represents an axis perpendicular to the optical axis (height from the optical axis), r represents a paraxial radius of curvature, κ represents a constant of the cone and A represents a coefficient of aspheric surface.

A pitch of the diffractive structure is defined generally by the use of an optical path difference function. Concretely, optical path difference function $\Phi b$ is expressed by (Numeral 2) with a unit of mm. Here, n is a diffraction order of a diffracted ray having the maximum diffraction efficiency among diffracted rays of a light flux having a wavelength of 405 nm generated by the diffractive structure, and in the objective lens unit 1 of the present embodiment, n is 6.

$$\Phi_b = n \sum_{j=1}^{5} b_{2j} h^{2j} \quad \text{(Numeral 2)}$$

Table 1 shows lens data for the first optical element B and the first optical element A. In this case, "−2.6004E−02", for example, means "$-2.6004 \times 10^{-2}$".

TABLE 1

| Surface Nos. | r (mm) | d (mm) | $N_{780}$ | $N_{650}$ | $N_{405}$ | $v_d$ | Remarks |
|---|---|---|---|---|---|---|---|
| S0 |  | d0 *1 |  |  |  |  | *2 |
| S1 | 73.397 | 0.700 | 1.53734 | 1.54090 | 1.56013 | 56.7 | *3 |
| S2 | 15.448 | 0.050 |  |  |  |  |  |
| S3 | 1.481 | 2.880 | 1.53734 | 1.54090 | 1.56013 | 56.7 | *4 |
| S4 | −2.213 | d4 *1 |  |  |  |  |  |
| S5 | ∞ | d5 *1 | 1.57062 | 1.57756 | 1.61949 | 30.0 | *5 |
| S6 | ∞ |  |  |  |  |  |  |

Coefficient of aspheric surface

|  | S1 | S2 | S3 | S4 |
|---|---|---|---|---|
| κ | 1.0000E+01 | −3.2040E+02 | −6.9456E−01 | −4.2199E+01 |
| $A_4$ | −2.6004E−02 | −2.3152E−02 | 8.6333E−03 | 8.7350E−02 |
| $A_6$ | 7.5368E−03 | 6.4221E−03 | 2.2473E−03 | −6.8060E−02 |
| $A_8$ | −1.7309E−03 | −3.6784E−04 | −1.0354E−03 | 1.8814E−02 |
| $A_{10}$ | 2.0472E−04 | 5.9437E−05 | 7.9520E−04 | 1.3888E−04 |
| $A_{12}$ |  |  | −1.3879E−04 | −8.1055E−04 |
| $A_{14}$ |  |  | −3.9714E−05 |  |
| $A_{16}$ |  |  | 1.7745E−05 |  |
| $A_{18}$ |  |  | 3.6874E−07 |  |
| $A_{20}$ |  |  | −6.0458E−07 |  |

Coefficient of diffractive surface

|  | S1 | S2 |
|---|---|---|
| $b_2$ | −1.0333E−03 | −1.3785E−03 |
| $b_4$ | 5.8830E−04 | −5.1124E−05 |
| $b_6$ | −5.3581E−05 | −1.8337E−05 |
| $b_8$ | −1.2776E−04 | −1.3817E−06 |
| $b_{10}$ | 2.0884E−05 | −3.4287E−06 |

TABLE 1-continued

|  | High density DVD | DVD | CD |
|---|---|---|---|
| d0 (Variable) | ∞ | 28.951 | 18.099 |
| d4 (Variable) | 0.602 | 0.505 | 0.266 |
| d5 (Variable) | 0.100 | 0.600 | 1.200 |

*1; Variable
*2; Light source
*3; Optical element A
*4; Optical element B
*5; Transparent base board

TABLE 2

| Diffractive ring-shaped zone | Height of start point (mm) | Height of end point (mm) |
|---|---|---|
| S1 | | |
| 1 | 0.000 | 0.748 |
| 2 | 0.748 | 1.190 |
| 3 | 1.190 | 1.351 |
| 4 | 1.351 | 1.441 |
| 5 | 1.441 | 1.507 |
| 6 | 1.507 | 1.559 |
| 7 | 1.559 | 1.602 |
| 8 | 1.602 | 1.641 |
| 9 | 1.641 | 1.675 |
| 10 | 1.675 | 1.706 |
| 11 | 1.706 | 1.735 |
| 12 | 1.735 | 1.762 |
| 13 | 1.762 | 1.787 |
| 14 | 1.787 | 1.811 |
| 15 | 1.811 | 1.834 |
| 16 | 1.834 | 1.857 |
| 17 | 1.857 | 1.878 |
| 18 | 1.878 | 1.900 |
| S2 | | |
| 1 | 0.000 | 0.545 |
| 2 | 0.545 | 0.766 |
| 3 | 0.766 | 0.930 |
| 4 | 0.930 | 1.064 |
| 5 | 1.064 | 1.176 |
| 6 | 1.176 | 1.272 |
| 7 | 1.272 | 1.355 |
| 8 | 1.355 | 1.427 |
| 9 | 1.427 | 1.490 |
| 10 | 1.490 | 1.546 |
| 11 | 1.546 | 1.595 |
| 12 | 1.595 | 1.639 |
| 13 | 1.639 | 1.678 |
| 14 | 1.678 | 1.714 |
| 15 | 1.714 | 1.746 |
| 16 | 1.746 | 1.776 |
| 17 | 1.776 | 1.803 |
| 18 | 1.803 | 1.828 |
| 19 | 1.828 | 1.852 |
| 20 | 1.852 | 1.874 |

Results of corrections for aforementioned (1)-(3) by the second optical element A will be shown below.

TABLE 3

Changes of spherical aberration caused by a difference of thickness of transparent protective base board

|  | High density DVD | DVD (incidence of a divergent light flux) | CD (incidence of a divergent light flux) |
|---|---|---|---|
| Optical element B only | 0.002 λrms | 0.037 λrms | 0.056 λrms |
| Objective lens unit (Optical | 0.004 λrms | 0.002 λrms | 0.006 λrms |

TABLE 3-continued

Changes of spherical aberration caused by a difference of thickness of transparent protective base board

|  | High density DVD | DVD (incidence of a divergent light flux) | CD (incidence of a divergent light flux) |
| --- | --- | --- | --- |
| element A + Optical element B) |  |  |  |

TABLE 4

Change in best image point position caused by mode-hop (+1 nm) of violet semiconductor laser oscillator

|  | Change in best image point position | Wavefront aberration including defocusing component |
| --- | --- | --- |
| Optical element B only | 0.49 μm | 0.162 λrms |
| Objective lens unit (Optical element A + Optical element B) | 0.004 μm | 0.030 λrms |

TABLE 5

Spherical aberration caused in recording/reproducing for high density DVD caused by decline of refractive index resulting from temperature rise of 30° C.

|  | Wavefront aberration |
| --- | --- |
| Optical element B only | 0.145 λrms |
| Objective lens unit (Optical element A + Optical element B) | 0.031 λrms |

As shown in Table 3, when the first optical element B is used for DVD (M2) or CD (M3), high order spherical aberration component still remains even when third-order spherical aberration component is removed by making a divergent light flux to enter. However, it is possible to correct properly not only third-order spherical aberration component but also high order spherical aberration component, by using the first optical element B in combination with the second optical element A.

Further, by determining the optimum wavelength and the optimum order for the diffractive structure as stated above, high diffraction efficiency shown below can be obtained for the diffracted light for recording/reproducing of data for various information recording media (high density DVD, DVD and CD) M1-M3.

High density DVD (405 nm, sixth-ordereded diffracted light): 93%
  DVD (650 nm, fourth-order diffracted light): 91%
  CD (780 nm, third-ordered diffracted light): 88%

Further, the diffractive structure of the second optical element A is arranged so that laser beams which are located to be outside the light fluxes necessary for recording and/or reproducing of DVD and CD do not contribute to formation of beam spots.

Figure 5:
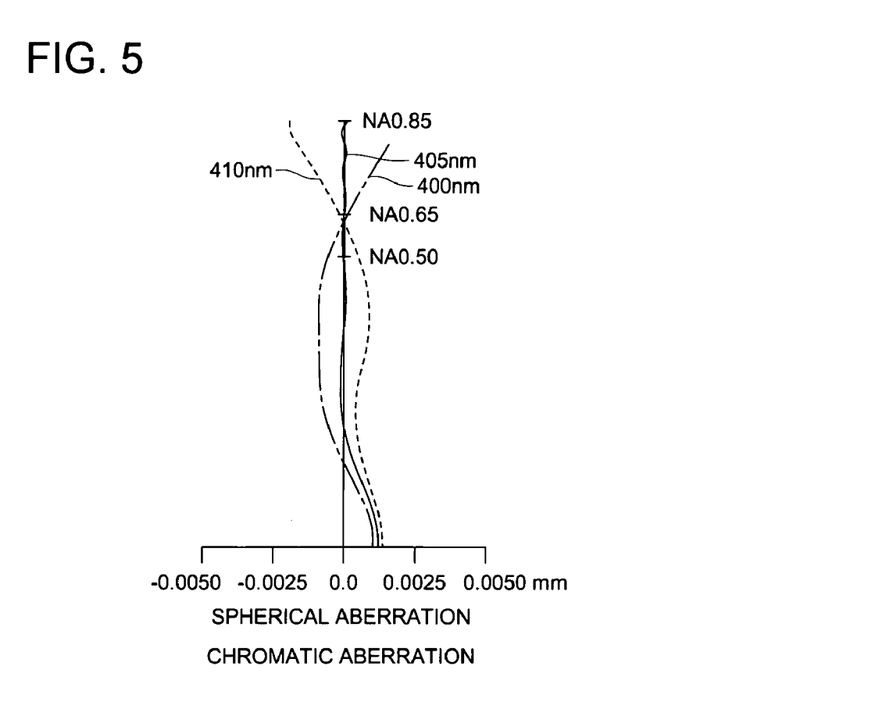
FIG. 5 is a diagram of aberration caused on an information recording surface of high density DVD when a light flux (wavelength is about 405 nm) for conducting recording and/or reproducing of information for high density DVD enters an example of an objective lens unit of the invention.

Namely, in case of recording/reproducing of DVD, each of light fluxes whose numerical apertures are 0.65 or more in laser L2 entering objective lens unit 1 from red semiconductor laser oscillator LD2 has large spherical aberration, as shown in the spherical aberration diagram in FIG. 5.

Figure 6:
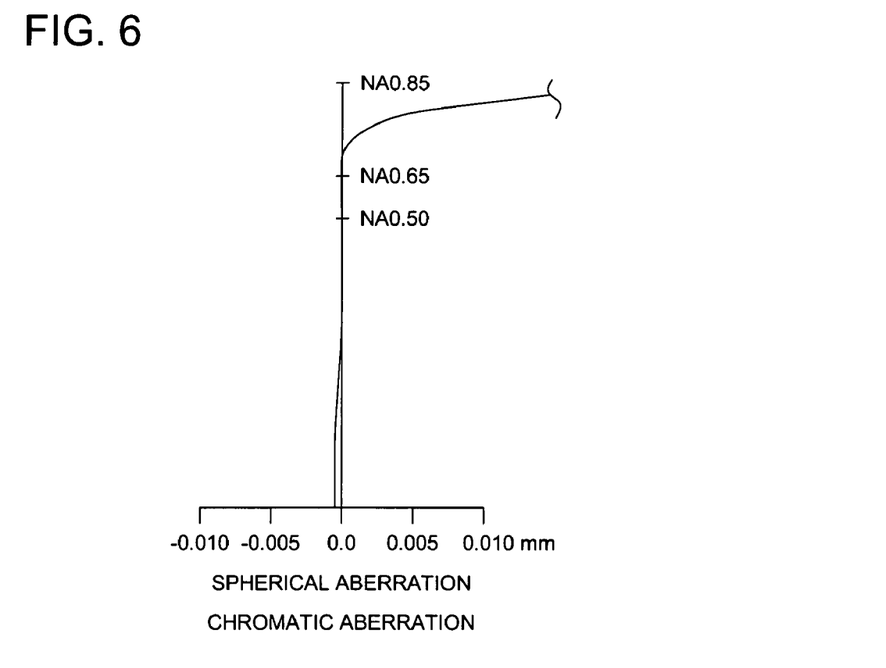
FIG. 6 is a diagram of aberration caused on an information recording surface of high density DVD when a light flux (wavelength is 650 nm) for conducting recording and/or reproducing of information for DVD enters an example of an objective lens unit of the invention.
Figure 7:
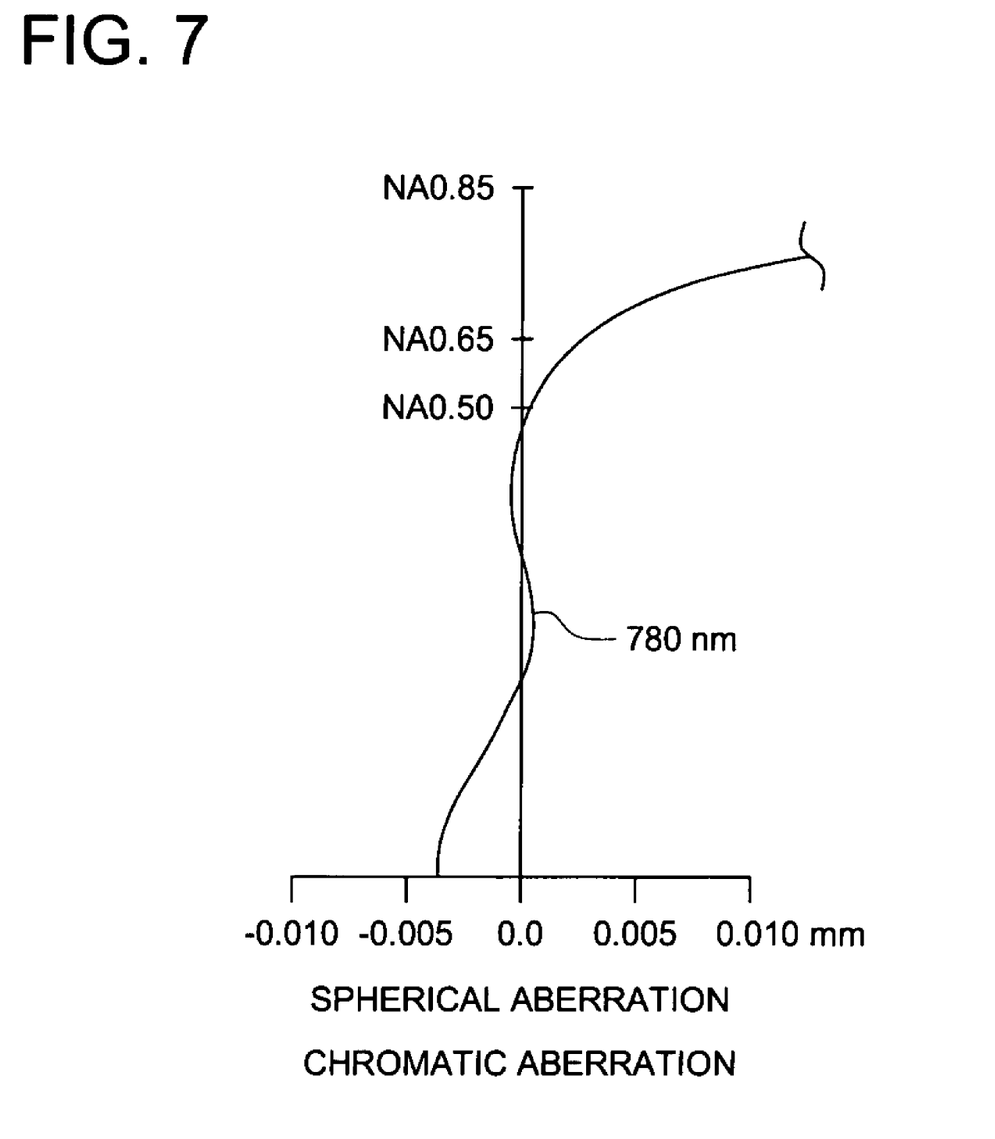
FIG. 7 is a diagram of aberration caused on an information recording surface of high density DVD when a light flux (wavelength is 780 nm) for conducting recording and/or reproducing of information for CD enters an example of an objective lens unit of the invention.

In case of recording/reproducing of CD, each of light fluxes whose numerical apertures are 0.50 or more in laser L3 entering objective lens unit 1 from red semiconductor laser oscillator LD3 has large spherical aberration, as shown in the spherical aberration diagram in FIG. 6.

Due to the foregoing, switching of the numerical aperture is automatically made depending on each optical information recording medium, which makes it unnecessary to provide a numerical aperture switching means (diaphragm or others) separately.

Figure 4:
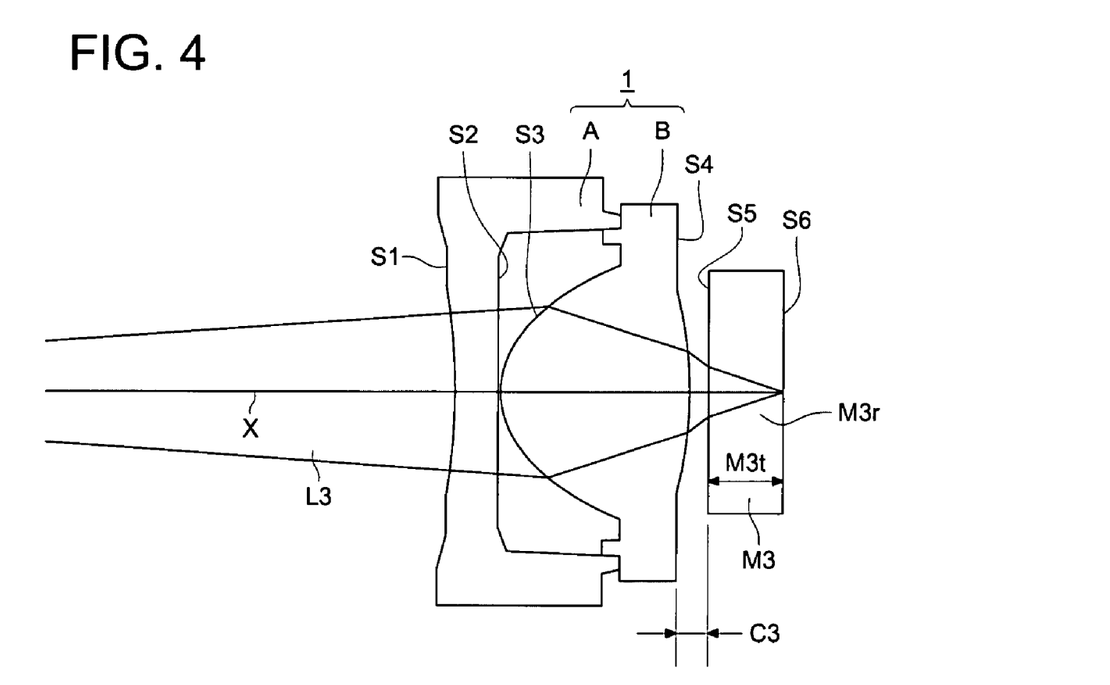
FIG. 4 is a diagram of an optical path showing how a light flux is converged on an optical recording surface of CD by an example of an objective lens unit of the invention.

When the first optical element B is used independently for recording/reproducing of high density DVD (M1), light-converging power for high density DVD is remarkably deteriorated in the case of mode-hop of violet semiconductor laser L1, as shown in FIG. 4. However, it is possible to make a change in a position of best image point caused by mode-hop of the violet semiconductor laser to be small.

Figure 3:
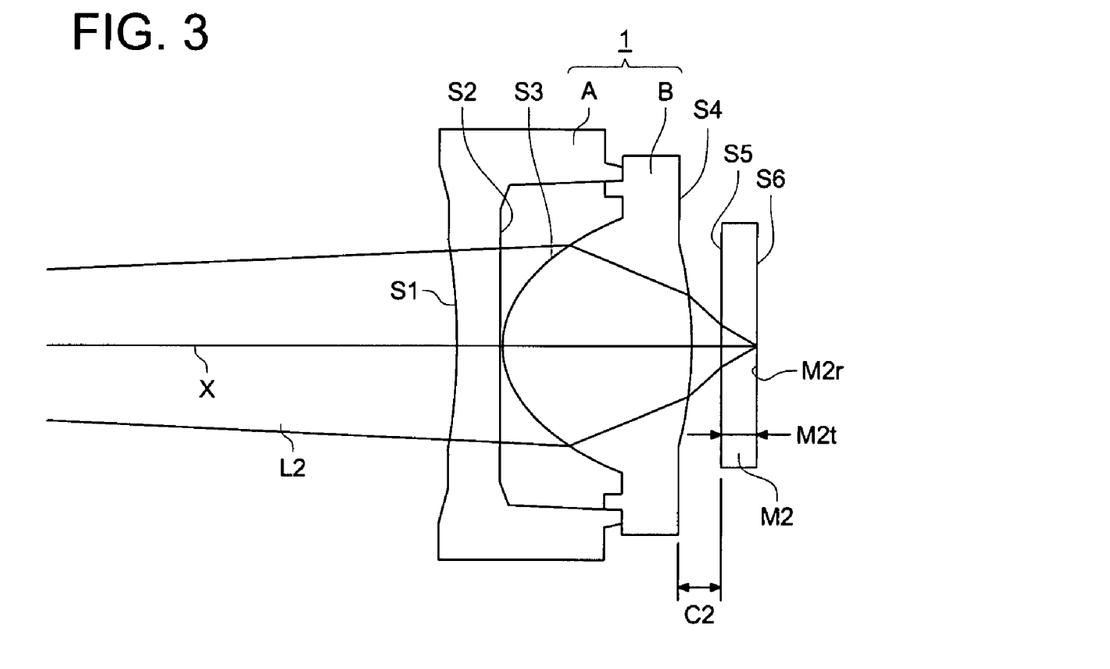
FIG. 3 is a diagram of an optical path showing how a light flux is converged on an optical recording surface of DVD by an example of an objective lens unit of the invention.

Since the diffractive structure of optical element A has the wavelength characteristic such that spherical aberration changes in the under-corrected direction as wavelength of incident light increases as shown in FIG. 3, it is possible to make both spherical aberration changed in the over-corrected direction on optical element B by a decline of refractive index caused by temperature rise and spherical aberration changed in the under-corrected direction by the shift of oscillated wavelength of a violet semiconductor laser to the long wavelength side caused by temperature rise to be canceled. As a result, it is possible to make a change of spherical aberration of the objective lens unit caused by temperature rise to be small, as shown in Table 5.

Since the sum of refractive power of each optical surface of the second optical element A and diffractive power of the diffractive structure is substantially zero, a light flux which has entered the second optical element A enters the first optical element B, without changing the slope angle of marginal ray substantially. Therefore, there hardly occurs a decline of diffraction efficiency caused by an influence of a shadow that is generated when a diffractive structure is formed on an optical surface closer to a light source on the first optical element B having a large curvature.

Compared with an occasion for forming a diffractive structure on an optical surface on one side, it is possible to broaden a distance between adjoining diffractive structures by forming diffractive structures on both sides, with respect to the second optical element A.

As shown on Table 2, the minimum value of the distance between adjoining diffractive structures is about 20 μm within an effective diameter of the second optical element A. Therefore, even when a form of the diffractive structure is deviated from a design form by manufacturing errors, a decline of diffraction efficiency caused by light of unwanted order can be made small.

Further, both the first optical element B and the first optical element A are represented by a plastic lens, and both of them are fitted with each other and are fixed to each other by flanges B2 and A2 formed respectively to be solid integrally with optical functional portions B1 and A1 respectively, and they are driven solidly by an actuator, thus, excellent tracking characteristics are constantly obtained.

Further, step Δ (see FIG. 2) formed on the outermost peripheral portion in an effective diameter of the optical element B has a function of a diaphragm that regulates an incident light flux.

Second Embodiment

Figure 8:
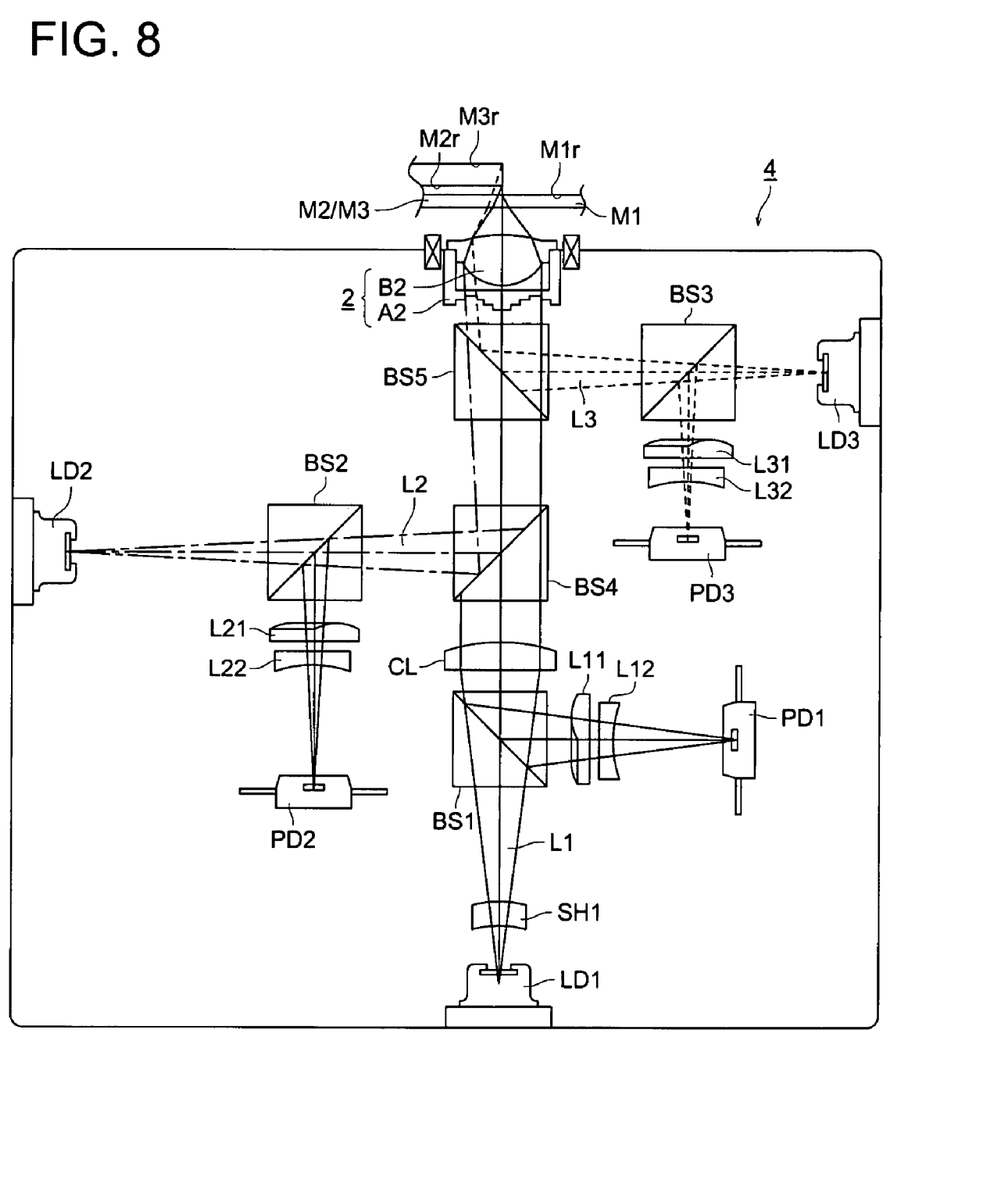
FIG. 8 is a schematic diagram showing the structure of another example of an optical pickup device of the invention.

FIG. 8 shows a variation of optical pickup device 3 in FIG. 1. In optical pickup device 4 in FIG. 8, on an optical surface of the second optical element A of second optical lens unit 2, there is provided a ring-shaped structure which is divided into plural ring-shaped zones and is formed to be displaced in the optical axis direction each other so that adjoining ring-shaped zones may generate a prescribed optical path difference for incident light.

Owing to the functions of the ring-shaped structure, objective lens unit 2 has interchangeability for three types of optical disks each having a different standard, in the same way as in objective lens unit 1 of optical pickup device 3 in FIG. 1, and it can conduct recording and/or reproducing of information for the aforementioned optical disks. In optical pickup device 4 in FIG. 8, all points other than the objective lens unit 2 are the same as those in the optical pickup device 3 in FIG. 1, and detailed explanation will be omitted accordingly.

Incidentally, in the embodiment mentioned above, the first optical element B only has the aberration correcting functions stated above, but, the aberration correcting functions may also be shared by both the first optical element and the second optical element.

Further, the objective lens unit 1 is composed of the first optical element B and the second optical element A, but, the objective lens unit in the invention is not limited to be composed of two optical elements, and it can be composed of three or more optical elements, as far as the technical scope of the invention is not exceeded. In that case, it is naturally preferable that adjoining optical elements which face each other are fixed at the prescribed relative position by the flange portions which are respectively formed solidly with optical functional portions respectively, as described in detail in the embodiment mentioned above.

Though there has been shown the example wherein the first optical element and the second optical element are manufactured through injection molding, these optical elements can be manufactured through various molding methods including an injection compression molding method or a compression molding method, without being limited to the injection molding method.

In the invention described in 1, since there are provided the first optical element to be arranged to face an optical information recording medium and the second optical element wherein, a ring-shaped structure that is divided into plural ring-shaped zones and is formed so that adjoining ring-shaped zones generate a prescribed optical path difference for incident light, is formed on at least one optical surface thereof, it is possible to achieve a high numerical aperture of the objective lens unit by setting the curvature of the optical surface of a light source of the first optical element, and to obtain an objective lens unit with a high efficiency of utilization of a laser beam by making an influence of a shade by a step portion of the ring-shaped structure to be small by setting the curvature of the optical surface of the second optical element to be relatively small.

It is also possible to make the objective lens unit to have interchangeability for plural types of optical information recording media, to correct chromatic aberration and to correct temperature characteristic aberration, by utilizing aberration correction functions of the ring-shaped structure of the second optical element.

Further, by forming the ring-shaped structure on the second optical element having a relatively small curvature on an optical surface, a pitch of the ring-shaped structure for realizing the aberration correction functions becomes large, which makes it possible to form the ring-shaped structure accurately.

The aberration of this kind means chromatic aberration, temperature characteristic aberration and the change in spherical aberration generated when a thickness of a transparent base board of the optical information recording medium is changed.

Further, since the flange portion of the first optical element and that of the second optical element are formed to be capable of fixing the first optical element and the second optical element respectively at the prescribed relative position, positioning of the first optical element and the second optical element at the relative position can be conducted accurately and easily. It is therefore possible to assemble the objective lens unit accurately and easily by combining them, after forming the first optical element and the second optical element separately.

In the invention described in Item 2, expenses for glass materials can be cut, and an optical element provided with a ring-shaped structure can be manufactured on a mass-production basis through injection molding employing a metal mold, thus, an objective lens unit can be manufactured at low cost.

In the invention described in Item 3, the same effects as in the invention described in Item 1 or 2 can be obtained, and paraxial power of the second optical element turns out to be small, thus, the curvature of the optical surface of the second optical element can be made small. As a result, it is possible to prevent a decline of the efficiency of utilization of a laser beam, because an influence of a shade of the step portion of the ring-shaped structure can be made small. Further, owing to that the curvature of the optical surface on which the ring-shaped structure of the second optical element is formed is small, it is possible to secure the larger pitch of the ring-shaped structure, compared with an occasion where such ring-shaped structure is formed on the optical surface of the first optical element where the curvature tends to be small, thus, it is possible to keep a decline of the efficiency of utilization of a laser beam resulting from a manufacture error in the shape of the ring-shaped structure to be small. Further, by making paraxial power of the second optical element to be small, a distance (working distance) between the objective lens and the optical information recording medium can be secured to be large.

In the invention described in Item 6, the same effects as those in the invention described in either one of Items 1-5 can be obtained, and chromatic aberration generated on at least the first optical element is corrected by the ring-shaped structure.

Therefore, even when an instantaneous change (mode-hop) of a wavelength of a laser is generated, in switching from the state of reading to the state of writing for the optical information recording medium, the chromatic aberration can be corrected.

In the case of high density DVD in particular, it is possible to prevent errors in the case of writing data on the optical information recording medium, because the wave length of the laser to be used is short compared with CD and DVD, although chromatic aberration tends to be generated by dispersion of the lens.

In the invention described in Item 10, the same effects as those in the invention described in either one of Items 1-9 can be obtained, and spherical aberration caused by a change of the thickness of the transparent base board of each of the information recording media and/or spherical aberration caused by a change of a wavelength used for recording and/or reproducing of information for each of the information recording media, is corrected, thus, it is possible to make the objective lens unit to have interchangeability for plural types of optical information recording media.

In the invention described in Item 11, the same effects as those in the invention described in either one of Items 1-10 can be obtained, and it is possible to obtain a light-weight objective lens unit wherein image height characteristics are excellent and a sufficient working distance can be secured. Namely, when the lower limit of the expression above is kept, the third-order astigmatism component in the case of evaluating image height characteristics with wavefront aberration is not too great, and high order coma component of fifth-order or higher is not too great. In addition, an edge thickness of the first optical element can be secured sufficiently. If the upper limit is kept, the third-order spherical aberration component in the case of evaluating image height characteristics with wavefront aberration is not too great, and fifth-order coma component is not too great, and coma difference is not too great. In addition, sufficient working distance can be secured, and a volume of the first optical element is not too great, thus, load on an actuator can be lightened.

In the invention described in 14, the same effects as those in the invention described in either one of Items 1-13 can be obtained, and the flange portion of the first optical element and the flange portion of the second optical element are formed to be in shapes which make them to be fitted each other and to be in contact with each other, and thereby, the relative positioning of the first optical element and the second optical element can be realized highly accurately and easily. It is therefore possible to combine the first optical element and the second optical element and thereby to assemble an objective lens unit accurately and easily, after forming the first optical element and the second optical element respectively.

In the invention described in Item 15, an optical pickup device having the same effects as those in the invention described in either one of Items 1-14 can be obtained.

In the invention described in Item 16, an optical information recording and reproducing apparatus having the same effects as those in the invention described in either one of Items 1-14 can be obtained.

What is claimed is:

1. An objective lens unit for converging a light flux onto an information recording plane of an optical information recording medium in an optical pickup apparatus, comprising:
    a first optical element arranged so as to be opposite to the optical information recording medium; and
    a second optical element arranged at a light source side of the first optical element so as to be opposite to the first optical element and including a ring-shaped structure in which plural ring-shaped zones are formed on at least one optical surface of the second optical element such that neighboring ring-shaped zones cause a predetermined optical path difference for incident rays;
    wherein the first optical element comprises:
        a first optical element functional section; and
        a first flange section integrally formed in one body around the first optical functional section,
    wherein the second optical element comprises:
        a second optical functional section; and
        a second flange section integrally formed in one body around the second optical function section, and
    wherein the first flange section and the second flange section come in contact with each other and are formed so as to fix the first and second optical elements at predetermined respective relative positions.

2. The objective lens unit of claim 1, wherein each of the first and second optical elements is a plastic lens.

3. The objective lens unit of claim 1 wherein the following formula is satisfied:

$$|P2/P1|<0.2$$

where P1 is a paraxial power ($mm^{-1}$) of the first optical element and P2 is a paraxial power ($mm^{-1}$) of the second optical element.

4. The objective lens unit of claim 1, wherein the neighboring ring-shaped zones are formed to displace relatively in an optical axis direction so as to cause the predetermined optical path difference.

5. The objective lens unit of claim 4, wherein the ring-shaped structure is a diffractive structure to diffract an incident ray.

6. The objective lens unit of claim 1, wherein the ring-shaped structure corrects a chromatic aberration caused by the first optical element.

7. The objective lens unit of claim 6, wherein a used wavelength is 500 nm or less.

8. The objective lens unit of claim 1 wherein the first optical element is a plastic lens and the ring-shaped structure corrects a spherical aberration caused by a change in refractive index of the first optical element.

9. The objective lens unit of claim 8, wherein an image side numerical aperture is 0.75 or more.

10. The objective lens unit of claim 1, wherein the objective lens unit is used to converge a light flux onto an information recording plane of plural different kind optical information recording mediums in which a thickness of a transparent substrate to protect an information recording plane of an information recording medium and a wavelength of a light flux used for recording and/or reproducing information are different from those of others, and
    wherein the ring-shaped structure corrects a spherical aberration due to a difference in thickness of a transparent substrate among the plural different kind optical information recording mediums and/or a spherical aberration due to a difference in wavelength of a light flux used for recording and/or reproducing information for the plural different kind optical information recording mediums.

11. The objective lens unit of claim 1 wherein the following formula is satisfied:

$$0.8<P1*T1\leq1.8$$

where P1 is a paraxial power ($mm^{-1}$) of the first optical element and T1 is a thickness (mm) of the first optical element on the optical axis.

12. The objective lens unit of claim 1, wherein the first optical element is a refractive lens.

13. The objective lens unit of claim 1, wherein the ring-shaped structure is formed on an aspherical surface.

14. The objective lens unit of claim 1, wherein the first flange section of the first optical element and the second flange section of the second optical element are shaped to fit and come in contact with each other so that the first and second optical elements are fixed at the predetermined respective relative positions.

15. An optical pickup apparatus, comprising: the objective lens unit described in claim 1.

16. An optical information recording and/or reproducing apparatus, comprising: the optical pickup apparatus described in claim 15.

17. An objective lens unit for converging a light flux onto an information recording plane of an optical information recording medium in an optical pickup apparatus, comprising:
- a first optical element; and
- a second optical element including a ring-shaped structure in which plural ring-shaped zones are formed on at least one optical surface of the second optical element such that neighboring ring-shaped zones cause a predetermined optical path difference for incident rays, wherein the first optical element comprises:
- a first optical functional section; and
- a first flange section integrally formed in one body around the first optical functional section, wherein the second optical element comprises:
- a second optical functional section; and
- a second flange section integrally formed in one body around the second optical functional section, and wherein the first flange section and the second flange section come in contact with each other and are formed so as to fix the first and second optical elements at predetermined respective relative positions.

* * * * *